May 22, 1951 H. J. RAPUANO 2,553,675
COOLING SYSTEM FOR AIRCRAFT ENGINES
Filed March 29, 1946 3 Sheets-Sheet 1

INVENTOR.
Henry J. Rapuano, Dec'd
BY By Doris H. Rapuano, Admix
M. B. Tasker
ATTORNEY Patented May 22, 1951

2,553,675

UNITED STATES PATENT OFFICE 2,553,675

COOLING SYSTEM FOR AIRCRAFT ENGINES

Henry J. Rapuano, deceased, late of Milford, Conn., by Doris H. Rapuano, administratrix, New Haven, Conn., assignor to United Aircraft Corporation, East Hartford, Conn., a corporation of Delaware Application March 29, 1946, Serial No. 658,260

13 Claims. (Cl. 230—270)

This invention relates to improvements in cooling systems for aircraft engines.

An object of the invention is to provide automatic means for maintaining the quantity of air discharged by an engine cooling fan for any given throttle setting substantially constant at all altitudes of flight.

Another object of the invention is to provide an engine cooling fan having blades of the controllable pitch type which are adjusted automatically by atmospheric pressure responsive means.

A further object of the invention is to provide improved mechanism for the support and control of the blades of a controllable pitch cooling fan.

These and other objects and advantages of the invention will appear more fully from the detailed description of one embodiment of the invention illustrated in the accompanying drawings.

In these drawings.

Figure 1:
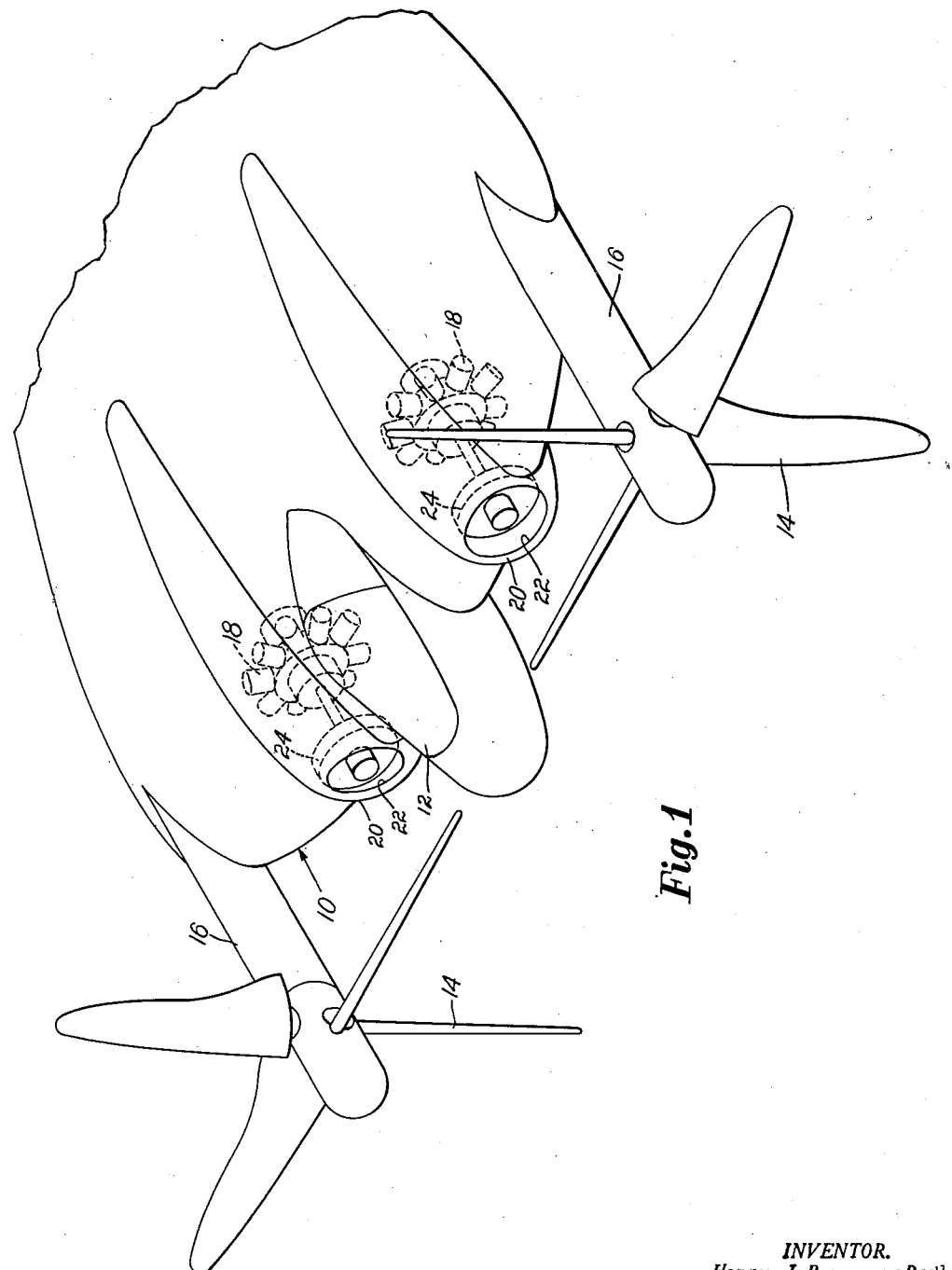
Fig. 1 is a perspective view of the forward portion of the airplane with the engines and the associated cooling means of the invention indicated diagrammatically in dotted lines.

The invention is illustrated in a low aspect ratio, all-wing airplane generally indicated as 10. The airplane has a central pilot compartment 12 projecting forwardly of the leading edge of the wing and two oppositely rotating propellers 14 mounted in propeller nacelles 16 projecting forwardly from the leading edge at the lateral extremities of the wing and driven by engines 18, herein shown as of the radial cylinder, air-cooled type. The engines 18 are located considerably aft of the leading edge of the wing in engine nacelles 20 extending fore and aft in the wing on opposite sides of the pilot compartment 12 well inboard of the propellers and having forward axial air inlet openings 22 through which air is inducted by engine driven fans 24, one of which is disposed forward of each engine 18.

The fans 24 are of the controllable pitch type, each having an annular hub 26 and a plurality of radially extended fan blades 28 mounted in the hub for pitch changing movement about their radial axes in response to pressure changes effecting an atmospheric pressure responsive bellows 30 which controls the energization of a reversible electric motor 32 for actuating the pitch changing mechanism of the fan blades 28.

Figure 2:
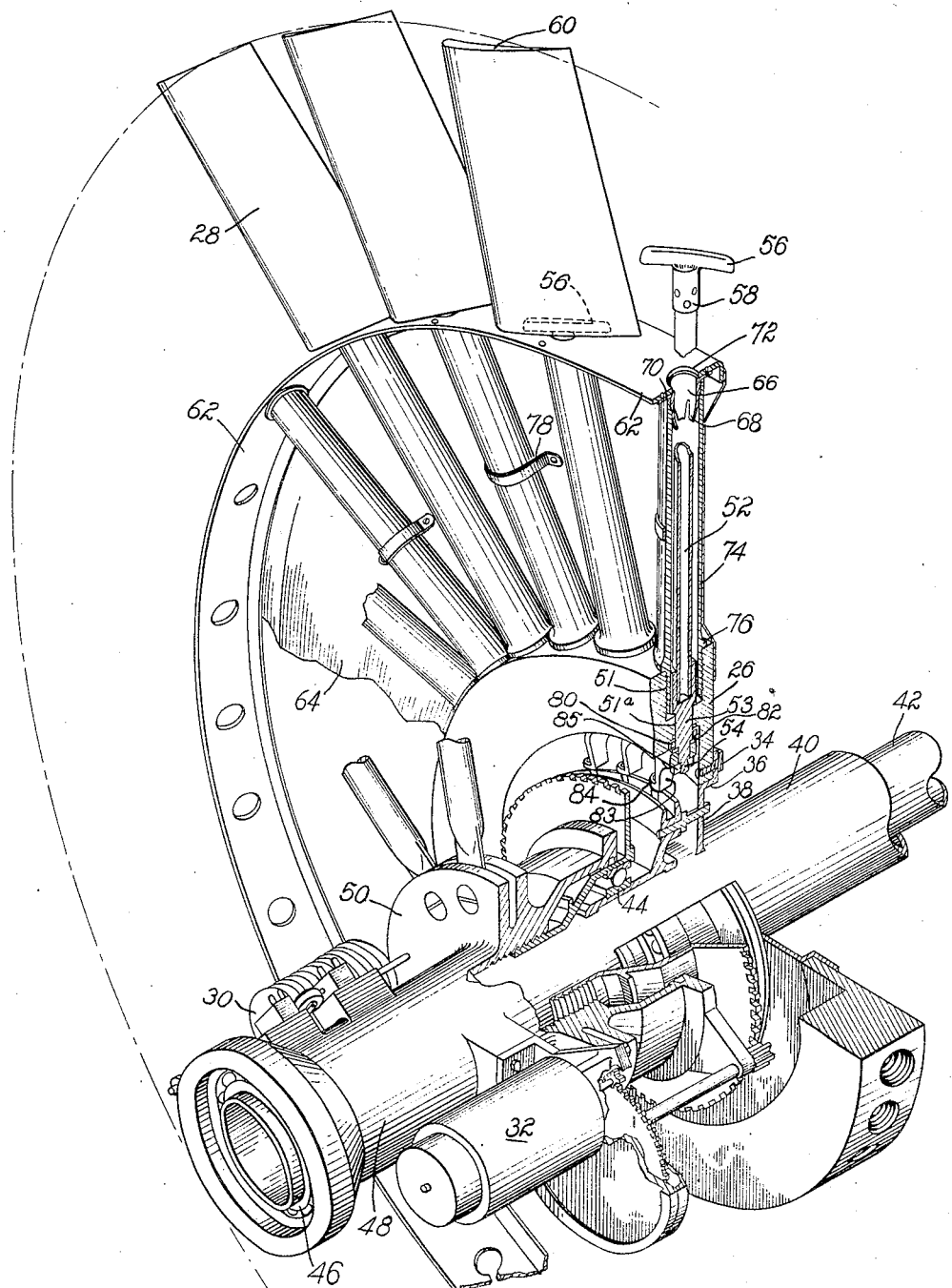
Fig. 2 is a perspective view on a larger scale of an engine cooling fan and its control mechanism with portions thereof broken away.
Figure 3:
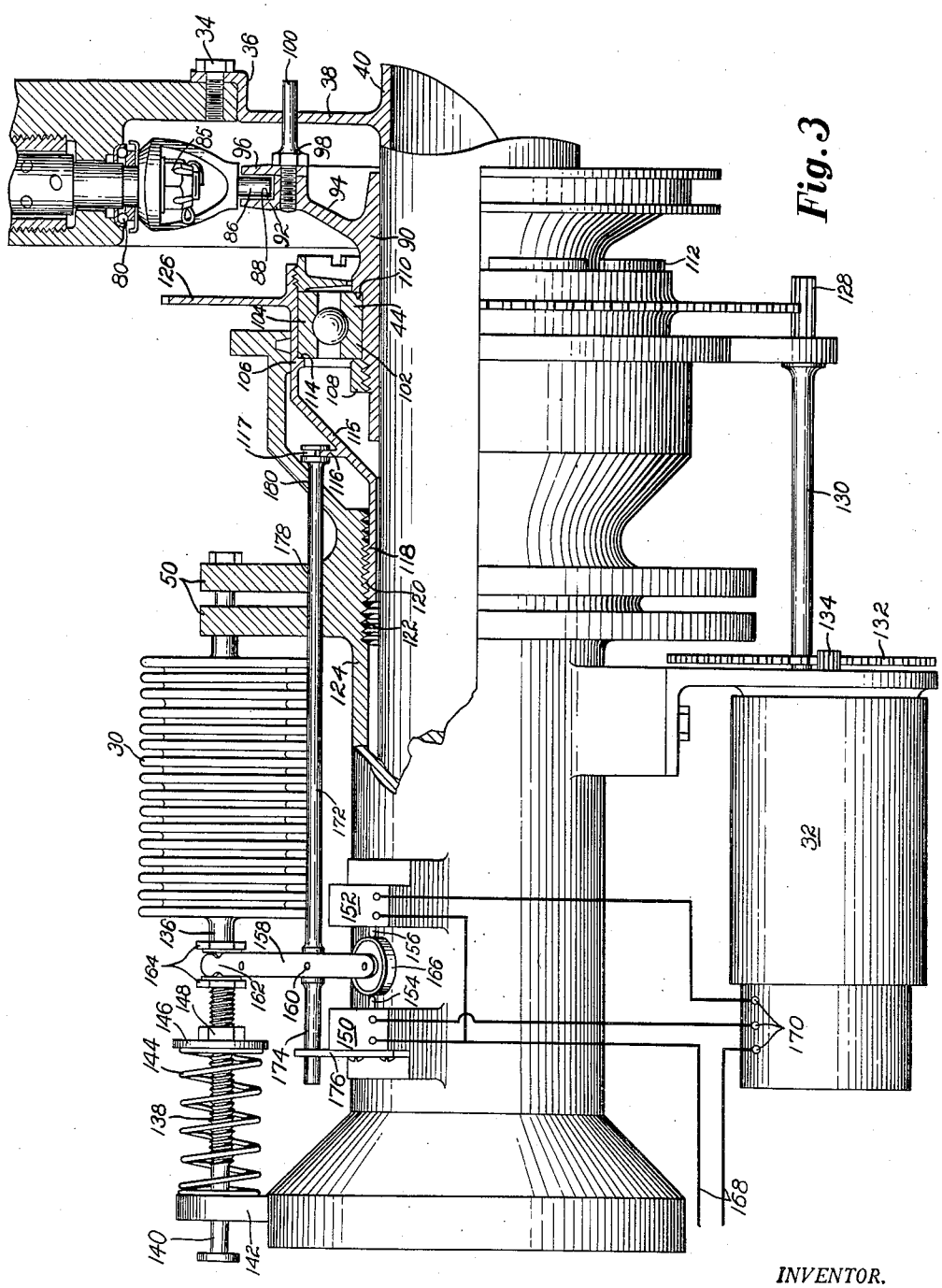
Fig. 3 is a view on a still larger scale of the hub structure of the fan and the atmospheric pressure responsive mechanism for controlling the pitch of the fan blades, parts being broken away to facilitate illustration.

Referring to Figs 2 and 3, the annular blade supporting hub 26 of the fan is secured by bolts 34 to the flanged rim 36 of a radial web 38 integrally united, as by welding, to an outer hollow shaft 40. The shaft 40 is supported on an inner hollow drive shaft 42, the shafts 40 and 42 having a splined connection at their forward ends. The shaft 42 extends aft of the fan and has a splined driving connection (not shown) to the crankshaft of engine 18. Immediately forward of the hub 26 and mounted on bearings 44 and 46 on the rotating structure above described is a generally cylindrical stationary supporting structure 48 which carries the bellows 30 and motor 32 and has an integral annular supporting flange 50.

The annular hub 26 of the fan has twenty-four equally spaced, internally threaded radial sockets 51 therein which are drilled approximately two-thirds of the way therethrough and communicating stepped passages 51a of increasing diameter which extend completely through the hub in which the blades of the fan are supported for pivotal movement about their radial axes on an inner radial tube 52 to the lower end of which is secured a cylindrical stepped fitting 53 provided with a lower externally threaded extremity 54. Secured to the upper end of tube 52 is a blade rib 56 which has an annular lower socket portion 58 receiving the upper end of tube 52. The blades 28 are of rolled metal construction, each having a second rib 60 at its outer end. The rolled metal of the blade is welded to the two ribs 56 and 60 and the socket 58 is riveted to the tube 52 so as to form a permanent blade assembly with the tube.

Each blade assembly is supported adjacent the base of its blade 28 in the right angle flange 62 of an annular baffle plate 64 which provides a radially extended partition from the hub 26 to the base of the blades. To this end, a flanged tubular sleeve 66 having resilient fingers 68 which frictionally engage the external surface of tube 52 has its flange 70 riveted to the flange 62 about the opening 72 in the latter through which the tube 52 extends. The purpose of the spring fingers 68 is to resist the rotation of the blade about its axis and thus provide sufficient friction damping to prevent flutter of the blades. The tubular sleeve 66 has an externally threaded portion beneath its flange 70 on which is threaded an outer tube 74 having its upper extremity abutting the flange 70 on the upper end of sleeve 66. The tube 74 also has an externally threaded lower end which is threaded into the threaded socket 51 in the hub structure 26, a shoulder 76 on this outer tube abutting the periphery of the annular hub 26. A clip 78 is provided about several of the outer tubes 74 intermediate their ends for securing plate 64.

Each blade assembly is inserted through a socket 51 with its stepped fitting 53 extending through the stepped passage 51a in the hub 26. A ball bearing 80 bears against an inwardly facing shoulder on the stepped fitting 53 and a corresponding shoulder on the stepped passage 51a and is held in place on the fitting 53 by a flange 82 on a torque lever 83 and a nut 85 threaded onto the extremity 54 of the fitting.

The torque lever 83 also has a flange 84 carrying a depending pin 86 which is eccentrically located relative to the axis of the blade assembly, the lowermost portion of which is drilled upward from the bottom and contains a cylinder of oil absorbent felt therein.

The pins 86 of all the blade assemblies are received in the annular channel 88 (Fig. 3) of a blade actuating sleeve 90 which is splined to shaft 40 so as to permit axial movement of the sleeve relative to the shaft for the purpose of actuating all the blades in unison through the medium of their torque levers. The channel 88 is formed by an upstanding annular flange 92 on the flange 94 of sleeve 90 and an annular flange 96 which is secured to flange 94 by special bolts 98 these bolts having elongated guiding shanks 100 which extend through the flange 38 of shaft 40. The sleeve 90 carries the race 102 of a ball bearing forward of its flange 94, the other race 104 of which is carried by an annular overhanging sleeve 106 of the relatively stationary hub structure. While this hub structure including sleeve 106 does not rotate at fan speed it is rotatably mounted on shaft 40 and sleeve 90 for a predetermined rotary movement to adjust the pitch of the fan blades, as will hereinafter be made clear. The race 102 is held against axial thrust by a nut 108 against a shoulder 110 while the race 104 is similarly held by a nut 112 against a shoulder 114 on the sleeve 106. The sleeve 106 has integral therewith a forward oblique portion 115 carrying an external radial flange 116 intermediate thereof and a tubular sleeve portion 118 which forms the forward bearing for sleeve 106 on the external surface of shaft 40. The sleeve 118 has an externally screw-threaded portion 120 cooperating with an internally threaded portion 122 of an annular stationary structure 124 which surrounds the shaft 40 and constitutes a support for the bellows 30 and motor 32.

The sleeve 106 has a spur gear 126 formed integral therewith which meshes with a smaller diameter, elongated spur pinion 128 on a shaft 130 carried by the fixed structure 124. The shaft 130 carries a large spur gear 132 which meshes with a small spur pinion 134 on the shaft of motor 32. The motor 32, which is of the reversible type, is thus operatively connected to rotate the sleeve 106 in opposite directions and hence by reason of its screw-threaded connection with the stationary structure 124 to reciprocate sleeve 106 and with it the rapidly rotating sleeve 90 which controls the lever assemblies of the blades.

The bellows 30 is rigidly supported at one of its ends on the supporting flange 50 and carries at its opposite and forward end an axial bellows shaft 136 having an intermediate screw-threaded portion 138 and a reduced unthreaded portion 140 which is slidable in an apertured support 142 carried by the rigid structure 124. A compression spring 144 has its forward end abutting support 142 and its aft end abutting a washer 146 which is adjustable along the threaded portion 138 of the bellows shaft by a nut 148. A pair of electric switches 150 and 152 having opposed operating members 154 and 156 are supported on the stationary supporting structure 124. These switches are adapted to be operated by a switch arm 158 which is pivoted at 160 and which has a yoke 162 at its free end received between spaced flanges 164 on the bellows shaft 136. The lever 158 carries a roller 166 which is disposed between the opposed switch operating members 154 and 156 so that upon the expansion of the bellows 30 the lever 158 will move about its pivot 160 to operate switch 152 while contraction of the bellows will cause the roller to engage and operate the switch 150. Current is supplied from line 168 through the switches 150 and 152 to the terminals 170 of the reversible electric motor 32 in a well-known manner so that closing of switch 150 will cause the motor to rotate in one direction while closing of the switch 152 will cause it to rotate in a reverse direction.

The pivot point 160 for lever 158 extends through a shaft 172 of a follow-up mechanism, the forward end 174 of which is guided in a bracket 176 carried by the fixed structure 124 and the aft end of which extends through aligned passages 178 and 180 in the fixed structure 124. The aft end of rod 172 has an annular channel 117 within which the upstanding flange 116 of sleeve 106 is received so that the follow-up rod is moved axially with the sleeve 106 while permitting the latter to be rotated in opposite directions by the motor 32.

It will be evident that the expansion of bellows 30 causes the switch 152 to be closed whereupon the motor 32 is operated to rotate the sleeve 106 in a direction to cause the threads 118 to move the sleeve axially in a forward direction to increase the angle of incidence of the fan blades 28. Similarly contraction of bellows 30 will cause switch 150 to be operated which energizes the motor 32 in a reverse direction to decrease the angle of incidence of the fan blades. It will also be evident that any movement of the sleeve 106 will result in an axial movement of the follow-up shaft 172 in the same direction of movement until the wheel 166 is again centered between the operating plungers 154 and 156 of the two switches 150 and 152. Thus an increment of movement of the bellows 30 results in a proportionate movement of the blade pitch adjusting mechanism after which the motor 32 is de-energized. Thus as changes in altitude of the airplane are reflected in the expansion or the contraction of the bellows 30, the pitch of the blades 28 are correspondingly changed so as to discharge the same quantity of air by weight through the engine nacelles for any given throttle setting of the engines. The bellows 30 contains a suitable gas which expands and contracts with temperature changes in the surrounding atmosphere as is usual in such atmospheric pressure responsive bellows.

As a result of this invention it is possible to control the cooling of the engines of the airplane so that adequate cooling is obtained at high altitudes where the density of the air is low and consequently a greater volume of air must be moved by the fan, while preventing over-cooling of the engine at lower altitudes. Thus better cooling is provided while a more efficient utilization of engine power is also made possible. Further, as a result of this invention it is made possible to adequately cool a low-aspect ratio all-wing airplane in which there is wide variation in flight attitude. It will further be evident that a particularly simple blade assembly for a controllable pitch blade has been provided as well as a rugged, trouble-free mechanism for adjusting the pitch of the fan blades in response to pressure changes due to variations in altitude.

While only one embodiment of the invention has been shown in the accompanying drawings, it will be evident that various changes may be made in the construction and arrangement of the parts without departing from the scope of the invention as defined in the appended claims.

What it is desired to secure by Letters Patent is:

1. Axial flow fan apparatus comprising, an enclosure, a fan for moving cooling air through said enclosure, said fan having a hub structure and a plurality of radial blades mounted in said structure for adjustment about their longitudinal axes to vary the volume of air moved by said fan at a given setting of the engine throttle, means for adjusting said blades about their axes including two cooperating elements, one being rotatable with said hub structure and the other being relatively stationary with respect thereto and having a toothed periphery, said elements being mounted for axial movement relative to said shaft and one having an operative connection with said blade adjusting means for adjusting said blades in opposite directions upon axial reciprocation of said other element, means for reciprocating said elements including a gear train operatively connected to said toothed periphery of said relatively stationary element, and an atmospheric pressure responsive expansible and contractable member for actuating said reciprocating means.

2. Axial flow fan apparatus comprising, an enclosure, a fan for moving cooling air through said enclosure, said fan having a hub and a plurality of blade assemblies mounted in said hub for pitch changing movement about radial axes extending from said hub, each of said blade assemblies having an eccentric operating member for adjusting its blade about its axis, and mechanism for operating all of said operating members in unison including an annular member rotatable with said hub and having an operative connection with said operating members, a relatively stationary member adjacent said annular member having an operative connection thereto, a reversible electromotive means operatively connected to said relatively stationary member for moving the latter axially, atmospheric pressure responsive means, means controlled by said pressure responsive means for energizing said electromotive means, and means controlled by the movement of said relatively stationary member for de-energizing said electromotive means.

3. A combination as defined in claim 2 in which the annular operating member is reciprocable along the axis of the fan hub and has an annular groove in which the operating members for the several blade assemblies are received.

4. Axial flow fan apparatus comprising, a fan enclosing structure, a drive shaft extending fore and aft in said structure, a concentric fan supporting shaft supported on said drive shaft and having a driving connection therewith, a fan hub structure carried by said concentric shaft having radially mounted blade assemblies carried thereby, each of said assemblies having an eccentric blade operating member for adjusting its blade about its radial axis, and blade adjusting mechanism common to all of said assemblies slidably mounted on said concentric shaft including an element rotatable with said hub and having an operative connection with said blade operating members and a cooperating relatively stationary element having a toothed periphery and operatively connected with said first element, and means carried by said enclosing structure for reciprocating said relatively stationary element axially of said shaft for effecting simultaneous adjustment of the blades of said fan including a gear train operatively connected with the toothed periphery of said relatively stationary element.

5. Axial flow fan apparatus comprising, a fan enclosure, a shaft extending fore and aft in said enclosure, a fan in said enclosure having a hub concentric with and rotatable about the axis of said shaft and having a plurality of radial blade assemblies mounted in said hub for pitch changing movement about said radial axes, each of said assemblies having a blade operating member for adjusting its blade about its axis, means for supporting said fan from said enclosure including a stationary fan supporting structure concentric with said shaft, and cooperating blade actuating mechanism located between said concentric supporting structure and said hub for operating said operating members in unison to adjust the pitch of said blades including two cooperating elements, one of said elements being rotatable with said hub and having a sliding support axially of said shaft and said other element being concentric therewith and being threaded to an internal surface of said stationary supporting structure whereby rotation of said relatively stationary element results in axial movement thereof, and means carried by said supporting structure for effecting rotational movement of said relatively stationary element.

6. An engine cooling fan including a hub and a plurality of radial blade assemblies mounted in said hub for pitch changing movement about said radial axes, each of said assemblies including an axial member journalled in said hub having a blade at its free end, means carried by said hub for supporting said blade assemblies adjacent the base of said blades, and means carried by said supporting means and biased into engagement with said axial members for frictionally damping movements of said blades about their axes.

7. A cooling fan including a hub and a plurality of radial blade assemblies mounted in said hub for pitch changing movement about their radial axes, each of said assemblies including an axial member journalled in said hub having a blade at its free end, and radially extended means carried by said hub for supporting said blades adjacent their bases, said supporting means including an annular flange through which said blade assemblies extend and said flange having tubular sleeves provided with resilient fingers for frictionally engaging and damping movements of said blades about their axes.

8. A fan apparatus including an enclosure for defining a gaseous fluid passage, an engine driven shaft extending longitudinally in said enclosure, a fan mounted on said shaft, said fan having a hub structure and a plurality of radial blades mounted in said structure for adjustment about their longitudinal axes to vary the volume of air moved by said fan, means for adjusting said blades about their axes including cooperating elements, one of which is rotatable with said hub structure and has an operative connection with said blades and the other of which is normally stationary relative to said rotatable element, said elements having an operative connection with each other by which movement of said relatively stationary element is transmitted to said rotatable element to operate said blades, and atmospheric responsive means including a driving means and a gear train driven thereby operatively connected to said relatively stationary element for adjusting the latter in accordance with variation in the density of the air entering said enclosure.

9. A fan apparatus as defined in claim 8 wherein the hub structure contains blade mounting means including a tubular sleeve with tapered resilient fingers for frictionally engaging and damping movement of said blades about their axes.

10. A fan apparatus as defined in claim 8 wherein the relatively stationary element is threaded to an internal surface of a concentric rigid mounting structure so that rotation of said relatively stationary element results in reciprocal movement thereof and such movement is transmitted to the rotating element for changing the pitch of the fan blades.

11. An engine cooling fan including a hub and a plurality of radial blade assemblies mounted in said hub for pitch changing movement about their radial axes, radially extended tubular members carried by said hub for supporting said assemblies, an annular flange spaced from said hub through which said assemblies extend, said assemblies comprising blade shanks extending through said tubular members and journaled in said hub and blades extending radially outwardly from said flange, and resilient means carried by said flange and extended between said tubular members and said blade shanks for frictionally engaging the latter and damping movements of said blade assemblies about their axes.

12. A combination as claimed in claim 11 in which the annular flange is supported by the ends of the tubular members and is spaced a substantial distance from the hub and comprises a baffle between the base of the blades and the hub carried tubular members.

13. A fan apparatus including an enclosure for defining a gaseous fluid passage, an engine driven shaft extending longitudinally in said enclosure, a fan mounted on said shaft, said fan having a hub structure and a plurality of radial blades mounted in said hub structure for adjustment about their longitudinal axes to vary the volume of air moved by said fan, means for adjusting said blades about their axes including cooperating elements, one of which is rotatable with said hub structure and has an operative connection with said blades and the other of which is normally stationary relative to said rotatable element, said elements having an operative connection with each other by which movement of said relatively stationary element is transmitted to said rotatable element to operate said blades, a reversible electromotive means, a gear train adapted to be driven by said electromotive means and operatively connected to said relatively stationary element, an atmospheric pressure responsive means, and means controlled by the expansion and contraction of said last mentioned means for energizing said electromotive means.

DORIS H. RAPUANO.
*Administratrix of the Estate of Henry J. Rapuano, Deceased.*

REFERENCES CITED

The following references are of record in the file of this patent:

UNITED STATES PATENTS

| Number | Name | Date |
|---|---|---|
| 1,327,381 | Furber | Jan. 6, 1920 |
| 1,420,619 | Barton | June 27, 1922 |
| 1,509,286 | Colly | Sept. 23, 1924 |
| 1,761,690 | Steinmetz | June 2, 1930 |
| 1,787,041 | Hughes | Dec. 30, 1930 |
| 1,830,858 | Schoepp et al. | Nov. 10, 1931 |
| 1,857,392 | Nixon | May 10, 1932 |
| 2,081,762 | Nissen | May 25, 1937 |
| 2,284,938 | Allen | June 2, 1942 |

FOREIGN PATENTS

| Number | Country | Date |
|---|---|---|
| 302,097 | Great Britain | Dec. 13, 1928 |